US009454748B2

(12) United States Patent
Payne (10) Patent No.: US 9,454,748 B2
(45) Date of Patent: *Sep. 27, 2016

(54) SYSTEM AND METHOD FOR DATA MANAGEMENT

(75) Inventor: J. David Payne, Broken Arrow, OK (US)

(73) Assignee: EDICHE, LLC, Tulsa, OK (US)

(*) Notice: Subject to any disclaimer, the term of this patent is extended or adjusted under 35 U.S.C. 154(b) by 500 days.

This patent is subject to a terminal disclaimer.

(21) Appl. No.: 12/910,706

(22) Filed: Oct. 22, 2010

(65) Prior Publication Data

US 2011/0040831 A1 Feb. 17, 2011

Related U.S. Application Data

(63) Continuation of application No. 10/643,516, filed on Aug. 19, 2003, now Pat. No. 7,822,816.

(60) Provisional application No. 60/404,491, filed on Aug. 19, 2002.

(51) Int. Cl.
| | |
|---|---|
| *G06Q 10/10* | (2012.01) |
| *G06F 17/24* | (2006.01) |
| *G06F 17/22* | (2006.01) |
| *G09B 7/06* | (2006.01) |
| *G06Q 30/02* | (2012.01) |

(52) U.S. Cl.
CPC ............ *G06Q 10/10* (2013.01); *G06Q 30/02* (2013.01); *G06F 17/2247* (2013.01); *G06F 17/243* (2013.01); *G06Q 30/0203* (2013.01); *G09B 7/06* (2013.01)

(58) Field of Classification Search
USPC ....................... 709/203, 223, 224
See application file for complete search history.

(56) References Cited

U.S. PATENT DOCUMENTS

| | | | | | |
|---|---|---|---|---|---|
| 4,937,439 | A | * | 6/1990 | Wanninger | G06F 3/033 235/456 |
| 5,442,786 | A | * | 8/1995 | Bowen | G06F 17/30961 707/758 |
| 5,555,101 | A | * | 9/1996 | Larson | G06F 17/243 358/400 |
| 5,704,029 | A | * | 12/1997 | Wright, Jr. | G06F 17/243 345/173 |

(Continued)

OTHER PUBLICATIONS

Dennis et al, Internet Question and Answer(iQ&A): A Web-Based Survey Technology, Jun. 2000, pp. 116-125.*

(Continued)

*Primary Examiner* — Backhean Tiv
(74) *Attorney, Agent, or Firm* — Fellers, Snider, Blankenship, Bailey & Tippens, P.C.

(57) ABSTRACT

A method for the management of data collected from a remote computing device including the steps of: creating a questionnaire; transmitting the questionnaire to a remote computer; executing the questionnaire in the remote computer to prompt a user for responses to questions of the questionnaire; transmitting the responses to a sever via a network; making the responses available on the Web. Preferably, computers used in connection with the inventive method are loosely networked in that network connections between computers are not always available and, when a connection is not available, data is stored at a node of the network and transmitted at the earliest time when a connection is available. In one preferred embodiment, the inventive method is used to collect survey data and to make the responses to the survey available to a client in virtually real time over the Internet.

22 Claims, 6 Drawing Sheets

(56) References Cited

U.S. PATENT DOCUMENTS

| | | | | |
|---|---|---|---|---|
| 5,757,916 | A * | 5/1998 | MacDoran | G01S 19/215 342/357.48 |
| 5,842,195 | A * | 11/1998 | Peters | G06Q 30/02 |
| 5,991,771 | A * | 11/1999 | Falls | G06F 9/466 |
| 6,163,811 | A * | 12/2000 | Porter | H04L 29/06 707/999.101 |
| 6,230,142 | B1 * | 5/2001 | Benigno | G06F 19/325 705/2 |
| 6,453,329 | B1 | 9/2002 | Dodgen | |
| 6,462,708 | B1 * | 10/2002 | Tsujimoto | G01S 5/0009 342/357.43 |
| 6,477,373 | B1 * | 11/2002 | Rappaport | H04W 36/12 455/436 |
| 6,519,571 | B1 * | 2/2003 | Guheen | G06Q 30/02 705/14.66 |
| 6,584,464 | B1 * | 6/2003 | Warthen | G06F 17/30398 |
| 6,615,166 | B1 * | 9/2003 | Guheen | G06Q 10/06 703/26 |
| 6,615,212 | B1 * | 9/2003 | Dutta | G06F 17/30569 |
| 6,618,746 | B2 | 9/2003 | Desai et al. | |
| 6,631,184 | B1 * | 10/2003 | Weiner | H04L 12/2854 379/92.01 |
| 6,826,726 | B2 * | 11/2004 | Hsing | G06F 17/30578 707/999.201 |
| 7,085,800 | B2 | 8/2006 | Abbott et al. | |
| 7,181,225 | B1 * | 2/2007 | Moton, Jr. | H04W 16/00 455/414.2 |
| 7,310,350 | B1 * | 12/2007 | Shao | H04W 4/00 370/338 |
| 7,693,283 | B2 * | 4/2010 | Livesay | H04L 63/0421 380/255 |
| 7,739,658 | B2 * | 6/2010 | Watson | G06F 17/30905 709/217 |
| 2001/0056374 | A1 * | 12/2001 | Joao | 705/14 |
| 2002/0007303 | A1 * | 1/2002 | Brookler | G06Q 30/02 705/7.32 |
| 2002/0026338 | A1 * | 2/2002 | Bukow | G06Q 10/06311 705/7.14 |
| 2002/0087361 | A1 * | 7/2002 | Benigno | G06F 19/325 705/3 |
| 2002/0137524 | A1 * | 9/2002 | Bade | H04W 12/08 455/456.2 |
| 2002/0147850 | A1 | 10/2002 | Richards et al. | |
| 2002/0194219 | A1 * | 12/2002 | Bradley | G06F 17/243 715/223 |
| 2003/0022656 | A1 * | 1/2003 | Hinnant, Jr. | G01S 5/02 455/410 |
| 2003/0041031 | A1 * | 2/2003 | Hedy | G06Q 20/10 705/51 |
| 2003/0198934 | A1 * | 10/2003 | Sendowski et al. | 434/350 |
| 2004/0117244 | A1 * | 6/2004 | Scott | 705/12 |
| 2004/0122730 | A1 * | 6/2004 | Tucciarone | G06Q 10/107 705/14.36 |
| 2004/0210472 | A1 * | 10/2004 | Lew et al. | 705/10 |
| 2007/0050256 | A1 * | 3/2007 | Walker | G06Q 30/00 705/14.19 |
| 2007/0242809 | A1 * | 10/2007 | Mousseau | H04M 7/0036 379/88.18 |
| 2008/0098291 | A1 * | 4/2008 | Bradley | G06F 17/243 715/223 |
| 2012/0008560 | A1 * | 1/2012 | Lewis | G06Q 20/102 370/328 |

OTHER PUBLICATIONS

"dcLINK The Total Solution", Aug. 1999, Publisher: Internet printout, Published in: US.

DSI Internet Printout entitled "Marketing Collateral," dated Feb. 24, 2002, Publisher: Internet Printout, Published in: US.

2002 DSI Press Releases dated Apr. 8, 2002 , Publisher: Internet.

* cited by examiner

SYSTEM AND METHOD FOR DATA MANAGEMENT

CROSS REFERENCE TO RELATED APPLICATION

This application claims the benefit of U.S. Provisional Application No. 60/404,491 filed Aug. 19, 2002, and is a continuation of co-pending U.S. application Ser. No. 10/643,516 filed on Aug. 19, 2003, scheduled to issue as U.S. Pat. No. 7,822,816 on Oct. 26, 2010, herein incorporated by reference in its entirety for all purposes.

BACKGROUND OF THE INVENTION

1. Field of the Invention

The present invention relates to a system of computing devices for the collection and management of information. More particularly, but not by way of limitation, the present invention relates to a system for collecting and managing information including a plurality of computer devices loosely networked to a server and an operating system for a computer which provides a number of features favorable for use in the inventive system.

2. Background of the Invention

Virtually all business software applications involve the collection of information in some form or another. Where information is gathered away from the convenience of a desktop, workers have traditionally entered the information on paper forms. This data is then entered into a computer in a second step. This extra step leads to delays and inaccuracies which are costly and, more importantly, unnecessary.

Handheld computers are well known in the art. In fact such computers are presently available from numerous manufacturers offering a vast assortment of operating systems and hardware configurations. While such devices come in a host of variations, generally handheld computers include an LCD display, a method for gathering manual input, storage, and a variety of machine interfaces, i.e., an IR link, a USB port, a serial port, etc.

As with their desktop, and laptop counterparts, a handheld computer will also include an operating system which provides an operator interface, file management, and standardized I/O, as well as facilitating the running of application programs. Thus far, handheld operating systems mimic those of desktop and laptop systems, despite the fact that handheld devices are typically used in a different manner and have radically different resources.

As with other types of computers, handheld computers suffer from compatibility issues, especially in the operation of application programs. Generally speaking, software programs must typically be tailored to a specific family of processors and to a specific operating system. Most applications are developed in a high level language and then compiled for a specific target processor. As different manufacturers select different processors, an application written for one family of processors must be recompiled to execute in a processor of a different family. Even when two manufacturers select compatible processors, if they chose different operating systems, applications written for one device will probably not run correctly on the other device. Since the operating system provides access to the various hardware resources and manages the file system, it is almost unfathomable that the operating systems of independent authors would be compatible, unless one specifically set out to copy the other. Thus, particular applications tend to grow up around a particular family of devices which share an operating system and, unfortunately, the application may not be available for non-compatible devices.

Another issue which is common to all computers is the transferability of stored information, specifically, the ability to move files from machine-to-machine. While most handheld computers include an infrared port for communicating with other infrared devices, including other handhelds, files transferred in such a manner may not be usable by software on the receiving device. This is especially true of information formatted for a particular application such as a word processor, spread sheet program, data base manager, or the like.

To overcome the necessity of compiling a program for a particular machine, an application may be written in an interpreted language, or a language which can be compiled to produce an intermediate language (i.e., a language that falls somewhere between source code and object code) such as i-code or tokens. In such a scheme, each device is provided with a run-time package which can execute the compiled i-code or tokens, the run-time package having been written for that particular device, thus, only the run-time package needs to be modified in order to port a program to a new computing environment. Once the run-time package is installed, any application authored in the language and which has been compiled to i-code will run on the target device. Unfortunately, such languages typically lack effective optimization and generally do not provide a broad range of support for hardware resources. Regardless of the language selected, whether compiled, interpreted, or whatever, software coding requires at least a nominal degree of programming skill to create the application program.

Perhaps because handheld computers are not as evolved as their desktop counterparts, or because it is typically cumbersome to enter information, or maybe due to the lack of a true front-runner in operating systems, handheld computers have not inspired the full range of software products available for larger computers. The result has been a rather limited selection of retail software applications for handheld devices as compared with their desktop counterparts, such software is aimed primarily at organizational tools, e-mail, and games. However, at the other end of the spectrum, custom programs tailored for a specific customer, handheld computers are gaining momentum in replacing manual forms which are often filled-out in remote areas, away from a desktop, i.e. manufacturing inventory, quality inspections, delivery systems, and the like. One reason for the increasing movement toward the use of handheld computers for data gathering tasks is that they can be easily transported to the source of the data and have the information directly entered into them, thereby eliminating the potentially error-prone step of manual data entry of information on previously completed paper forms. Eliminating the extra step additionally saves unnecessary labor, and allows the data to be entered in a more timely fashion.

Due to their incredible portability, handhelds are particularly well suited to this type of data gathering, despite an obvious lack of software infrastructure in this area. The present trend is for a business to commission the authoring of a custom program aimed at a particular need. While the cost of such an application is usually high, the accuracy of the information, the timeliness of the information, and the accessibility of the information are likely worth the cost. In fact, while such systems may seem cost prohibitive to develop, in many cases the actual cost on a per-data-entry basis may prove to be relatively small, especially in light of the timeliness and accuracy associated with real time data collection.

To develop software for a handheld computer, a custom program is typically developed and tested on a larger system. When the developer is satisfied with the program, it is compiled for a particular target device and transferred to handheld devices through a communication link. If users are using more than one type of device, the same program must be tested and compiled for each type of device. If a change is required, the developer must make the change on the development system and re-transfer the entire program to each target device.

In a typical data gathering application, information is entered into custom designed forms on the handheld computer. Eventually, the data entered in the handheld finds its way to a database, which is typically located on a server which is accessible to those needing the information or from which it may be accessed by other programs such as accounting systems, materials management programs, etc. Present day servers are well suited to the task of information management and generally provide broad access to and searchability to collected data.

One problem area in such systems becomes apparent when the data is transferred from the handheld to the server. While it would seem that wireless interfaces and handhelds were made for each other, the marriage of the two is not without its own set of problems. Wireless interfaces fall into a number of different categories. At one extreme is the infrared ("IR") port often found on handheld devices. The range of this type of interface is usually limited to a few feet and typically supports transfer rates of 115 kbaud, or less.

Another method for wireless communication is via a wireless local area network or "WLAN." A typical example of a WLAN is that defined by the IEEE 802.11 standard. When a handheld computer is equipped with a WLAN interface, the device can communicate with other computers also equipped with a WLAN interface, or even computers networked to a WLAN equipped computer by a wired network. Typically, WLAN interfaces provide a range of several hundred feet. As long as a handheld is within the range of another WLAN equipped computer, the network connection is continuous. Wireless local area networks sport data rates from a few thousand bits per second up to at least 52 million bits per second, depending on the particular standard employed.

Yet another known wireless interface for handheld computers is a CDPD interface, CDMA interface, GSM interface, or similar wireless interface or modem. While there are some variations, these systems are often built around a cellular phone network and provide coverage similar to that of a cellular phone, typically national, or even international, coverage. Such interfaces will experience the same gaps in service as can be expected with a cell phone. While such systems provide an exceptionally wide area of coverage, they typically do so at limited bandwidth, e.g. 19.2 kbaud.

Of course handheld devices are not limited to wireless communications. Typically such devices can be connected to another computer through a universal serial bus ("USB") connection, an RS-232 connection, an Ethernet connection on a properly equipped device, or similar hardwired connection. While these interfaces range from moderately paced to the extremely fast, they are exceptionally reliable, at least while the connection is in place. Unfortunately, few environments are well suited to tethering a handheld to allow a continuous wired connection.

It can be seen that perhaps the greatest drawback to using a handheld for data gathering as part of a larger system are the limitations of the data link: 1) it is unlikely that the data link will always be available; and 2) the bandwidth of most of the practical wireless options is restrictive. Presently there are two methods for dealing with the problem of data link availability. In one scheme, data is transmitted as it is collected. The advantage of such a scheme is that the database is updated in real time and represents current data. The disadvantages are, for all practical purposes, the scheme is limited to systems using a wireless interface and when the wireless link is not operational, generally data cannot be entered.

Alternatively, entered data can be stored locally on the handheld and transmitted in a batch process when a link is established. The advantage of this system is that it is tolerant of gaps in the communication link and works well with wired transfers of data. Unfortunately, data is not delivered in real time and the data base may be somewhat stale, depending on the length of time between the collection of data and the presence of the link.

The issue of bandwidth may be problematic on several fronts. If programs are updated periodically, the entire program must be sent and the time to reload may be objectionable. In the opposite direction, if large amounts of data are collected, it may be time consuming to send the data collected from the handheld to the server, particularly when performed in a batch fashion.

It is thus an object of the present invention to provide an operating system for a handheld computer which will allow a program to execute on any handheld computer.

It is a further object of the present invention to provide an operating system for a handheld computer wherein programming changes will only necessitate incremental transfers of program instructions.

It is still a further object of the present invention to provide an operating system for a handheld computer wherein files may be transferred among devices without a translation or conversion.

It is yet a further object of the present invention to provide an operating system for a handheld computer wherein programming steps and data are tokenized to reduce the load on a communication channel of finite bandwidth.

It is yet a further object of the present invention to provide a system of networked computers in which modifications to a computer program for a remote computer are sent in real time to the remote computer and are implemented immediately and seamlessly without the requirement of user installation.

SUMMARY OF THE INVENTION

The present invention provides a system and method for the management of information which solves the problems and alleviates the needs discussed above. In its broadest sense, the present invention is a method designed to accomplish the following:

1) Allow any computer(s) (desktops, laptops, handhelds, portables, etc.) to be used to capture information;

2) Transfer the information to a data center (via file transfer methods such as a network, to include, but not necessarily, Internet based) in a form that the data center can recognize;

3) Allow another computer(s) to access the information and download it from the data center in a format that can be readily used regardless of the format in which the original information was gathered.

In a preferred embodiment, a server is loosely networked to a plurality of computers (handheld, laptop, or desktop). Each computer is equipped with an operating system which allows common programming to execute on any device, regardless of hardware differences or native operating system differences among the plurality of devices.

With regard to the present invention, the term "loosely networked" is used to describe a networked computer system wherein devices on the network are tolerant of intermittent network connections and, in fact, tolerant of the type of network connection available. In particular, if any communication connection is available between devices wishing to communicate, network transmissions occur normally, in real time. If a network connection is unavailable at that moment, the information is temporarily stored in the device and later transmitted when the connection is restored. Unless otherwise specified, hereinafter the terms "network" or "networked" refer to loosely networked devices.

Thus, the operating system may be thought of as device indifferent and communication channel indifferent. In the preferred embodiment, any computer can execute any program developed for the inventive system and will communicate with other members of the system through any communication method the device can find available.

The operating system provided in each computer device allows the use of a common instruction set in any such device, regardless of compatibility issues between the devices, wherein "instruction set" is used herein to mean the commands, tokens, etc., that are recognized by the operating system as valid instructions. Unlike conventional computer programs, the operating system employed in the inventive system allows incremental changes to the program without the need to reload the entire program. Additionally, a programming change made at a central office will automatically propagate to loosely networked computers dispersed throughout the field.

In one aspect of the invention, branching logic depending on the programs are created for handheld or other computer devices by simply entering questions and providing response specification, in the form of a questionnaire, for the end-user. Thus, no particular programming skill is required to generate programs for data gathering. As will be appreciated by those familiar with data collection, data can be collected by posing a series of questions, or otherwise prompting for specific input from the user, as in the manner used with paper forms. A number of useful subsystems, which may already be present in the handheld device, or easily added later, may be utilized so that at least some of the information which is responsive to the designed questionnaire may be collected automatically rather than entered manually, e.g., time and date, position information if the device includes a GPS receiver, etc.

In another aspect of the present invention, the program and user responses are coded in such a fashion as to substantially reduce the bandwidth requirements of the network connection. Since many of the networking options for handheld devices provide limited bandwidth, best use may be made of the available throughput by coding, or tokenizing, program information and responses.

In practice, a program is created by entering a series of prompts and providing direction for how the system is to respond to particular responses. This process of data gathering may then be performed by a person having no programming skill whatsoever. The program may then be sent to all, or selected, computer devices on the network. Those devices having a connection may immediately be updated. Those devices in which a network connection is temporarily not available will be updated when the connection is next restored.

The user of the computer device is then prompted for specific input. As the user enters data, if the network connection is available, the information is immediately sent to the server. If the network connection is unavailable, the information is stored locally in the handheld device and sent upon restoration of the network connection. At the server, the information is typically processed upon receipt such that users of the data have real time, or virtually real time, information available.

In another aspect of the invention, the inventive system may be provided to end users according to an application service provider ("ASP") business method. ASPs are an emerging trend in the computer software industry. Traditionally, a company seeking a software solution would either acquire a preprogrammed package which suits its needs or commission the programming of custom software. In many instances preprogrammed software is unavailable or requires too many compromises to be attractive. In either case, the software is purchased and, invariably, represents a large capital expense to the company. Once purchased, modifications, evolutional upgrades, changing management practices, and the like, result in additional expenses to keep the software up-to-date.

In contrast an ASP typically provides software on a pay-as-you-go basis. An ASP typically provides custom, or semi-custom software to companies. Each user is billed for the time it uses the software. The advantages to the end user are obvious. There is no crippling up-front expense, modifications and upgrades are the responsibility of the ASP, if the software does not perform satisfactorily the customer simply walks away and never incurs large expenses. On the ASP side, the software vendor enjoys recurring income and the ability to adapt the same software model to numerous customers. While differing slightly from the traditional ASP model, the present invention is particularly well suited to a per-transaction billing model.

With regard to the current system, an ASP can provide a web site which allows users to build an application on line, possibly without incurring any expense. Once the customer is satisfied with the program, it can automatically be deployed to designated computer devices within the system. When a user provides input, the computer device can find a direct network connection to the ASP or, more likely, find an Internet connection and report the data to the ASP via the Internet connection. Once received at the ASP, the data can be processed and is available for viewing or use by the client virtually instantly via the Internet. Thus, data entered at any location may be viewed by the client in real time, worldwide.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
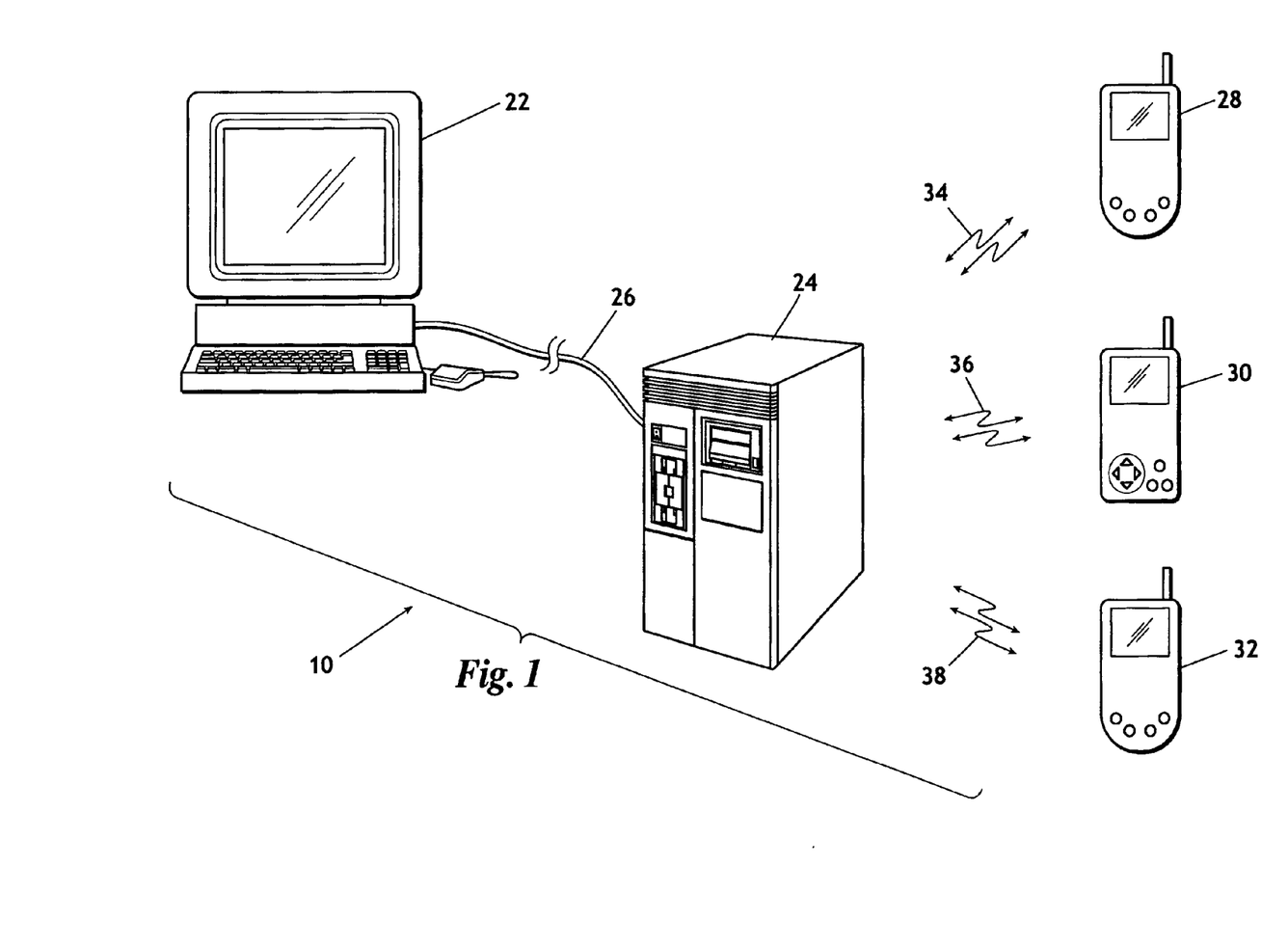
FIG. 1 provides a diagram of the inventive system.

Referring now to the drawings, wherein like reference numerals indicate the same parts throughout the several views, a diagram of the inventive system is shown in FIG. 1. Typically, the system for data management 10 includes: at least one server 24 preferably having an Internet connection 26; a plurality of handheld computers 28-32 operated remotely from server 24, each handheld 28-32 including a network connection 34-38, respectively, for loosely networking handhelds 28-32 to server 24; and a computer 22 connected to the Internet for providing administration of the system and for reviewing data collected by the system.

Server 24 is shown preferably connected to the Internet 26 and loosely networked to handheld computers 28-32 through connections 34-38, respectively. As will be apparent to those skilled in the art, network connection 26 could instead be local area network or a private wide area network. Similarly, connections 34-38 may be any one of a number of optional connections which ultimately connect a remote device to server 24. By way of example and not limitation, connection 34 could be a simple dial up connection through a conventional telephone line to connect handheld 28 directly to server 24. At the same time, connection 36 could be an infrared (IR) connection between handheld 30 and a desktop computer (not shown) which in turn, is connected to server 24 via the Internet. Connection 38 could be a wireless modem, i.e., a CDPD interface, a CDMA interface, a GSM interface, an analog cellular modem, or the like, which either establishes a direct connection with server 24 or establishes an Internet connection to reach server 24 via the Internet. Other options would include a wireless LAN connection, a direct RS-232 connection, a docking station connected to a desktop computer, etc. It should be noted that, regardless of the type of connection, handhelds 28-32 are ultimately connectable to server 24 in a loosely networked fashion.

It should be noted that handheld computers 28-32 need not be the same type, or even compatible devices. As a part of the inventive system each remote device, preferably a handheld computer, is provided with an operating instruction system ("OIS") which overlays its native operating system. Once equipped with the OIS, a remote device can be programmed according to methods described hereinafter. Any program developed under the inventive system will run on any handheld computer equipped with the OIS and files on one such handheld will transfer freely to any other handheld or any computer connected to the inventive system.

As noted above, with regard to the present invention, the term "loosely networked" is used to describe a networked computer system wherein devices on the network are tolerant of intermittent network connections. In particular, if any communication connection is available between devices wishing to communicate, network transmissions occur normally, in real time. If a network connection is unavailable, the information is temporarily stored in the device and later transmitted when the connection is restored. Unless otherwise specified, hereinafter the terms "network" or "networked" refer to loosely networked devices.

It should also be noted that the inventive system is indifferent as to the particular type of communication channel used for connections 34-36. Thus, by way of example and not limitation, while connection 36 might today be an IR link to a desktop computer which accesses server 24 via the Internet, tomorrow, handheld 30 might establish a connection 36 with server 24 via a CDPD interface. The particular link selected will be the first available link.

Figure 2:
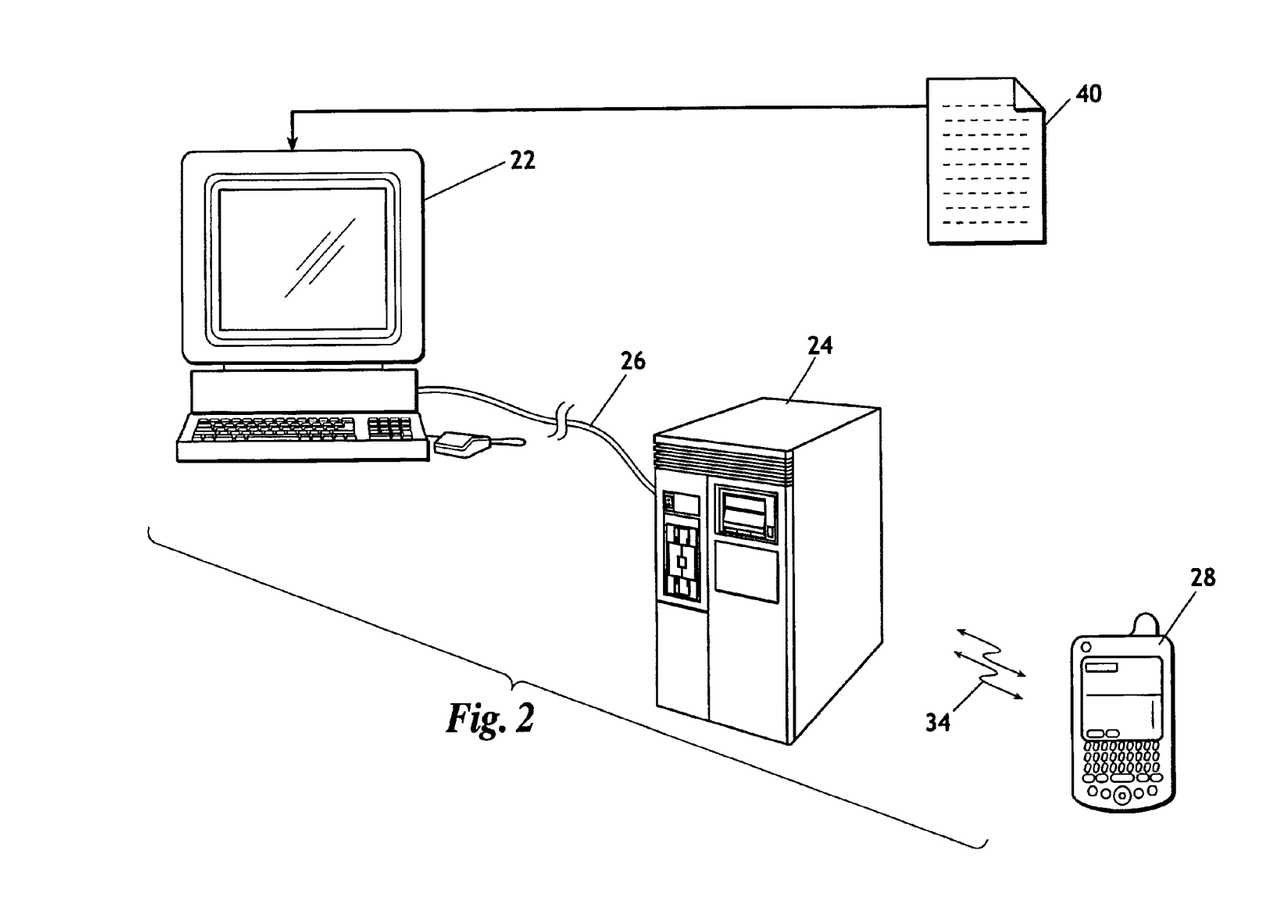
FIG. 2 provides a diagram of the inventive system as used for form creation.

The inventive system may be thought of as taking on two distinct modes of operation. First, as shown in FIG. 2, the system provides an administrative function. From any computer 22 connected to the Internet 26, a client can access server 24 to administer the inventive system. Administration involves tasks such as form creation, management, and validation; user setup, and management of system security.

In terms of the present invention, handheld computers are favored for their portability and their usefulness in gathering data from the field, whether the field is a stockroom for a manufacturing facility, a production floor, a delivery site for a product, etc. More generally, field locations are typically areas where people work without the convenience of a desktop.

According to the preferred arrangement, data may be gathered by prompting the user via the handheld 28 with a series of questions or statements, each of which calls for a response. This series of questions or statements will have been constructed on computer 22 and reduced to tokenized form for transmission to the handheld 28. For purposes of the instant disclosure, the series of questions/statements will collectively be referred to as a questionnaire. As will be discussed in greater detail below, the questionnaire is actually designed to include internal branching logic which is implemented by the OIS. Hence, with regard to the present invention, the terms "program" and "form" are used interchangeably with questionnaire.

An important aspect of the invention is the ease with which a client can create a form and distribute the form to the appropriate handheld devices in the field. Continuing with FIG. 2, typically a client uses a computer 22 having access to the Internet 26 to communicate with server 24. As part of the administrative function provided by system 10, computer 22 provides a web-based interface which allows a client to create a questionnaire. As a first step, preferably, the client selects a type of question from a list of standard question types. This list would include alternatives for the way the question is posed to the user, for example visual or vocal, and the type of answer to expect, whether yes/no, multiple choice, narrative, numerical, etc.

As the client creates a list of questions, symbols from a tool bar may be used to control conditional branching based on the user's response. As the client enters questions and selects response types, server 24 builds a stack of questions and responses, and assigns indices, or tokens, which point to each question or response. Each token preferably corresponds to a logical, mathematical, or branching operation and is preferably selected and made a part of the questionnaire through a graphical user interface. By this mechanism, a user is able to create a series of questions, the precise nature of which is dependent on the user's responses. For example, the questionnaire designer might desire to create a form that asks the user different questions; depending on whether the user was male or female. In order to do this, the designer would enter the questions ("Are you a man or woman?"); select a response (a "pop up" list of two entries male and female); select a token (branch if "male"); assign that token to this question; and, specify an "end" location for the "branch" (i.e., the first question asked of "males").

When the questionnaire 40 is complete, server 24 sends the stack of questions and defined responses to the appropriate handheld devices, as represented by handheld 28, via the loosely networked connection 34. In addition, server 24 sends the operating logic for that questionnaire, which is simply a list of tokens which point to the questions and responses to each question as well as tokens for program control or math operations. As will be apparent to those skilled in the art, if a question or response is repeated within the questionnaire, only a pointer need be repeated in the program list, not the entire question.

According to another preferred arrangement, there is provided a system, substantially as defined above, wherein the questionnaire which is transmitted to the handheld can be incrementally updated on each networked handheld 28, rather than resending the entire questionnaire. For example, if a question is modified or replaced, the new question and a new list are the only information which need to be transmitted to the handheld device 28. This incremental update capability dramatically reduces the quantity of computer instructions required to update a form. It should be noted that, if connection 34 is present, the program update will take place virtually at the same time the client finishes questionnaire 40 at computer 22. If the network connection is unavailable, the update will happen automatically as soon as the connection 34 is restored.

Figure 3:
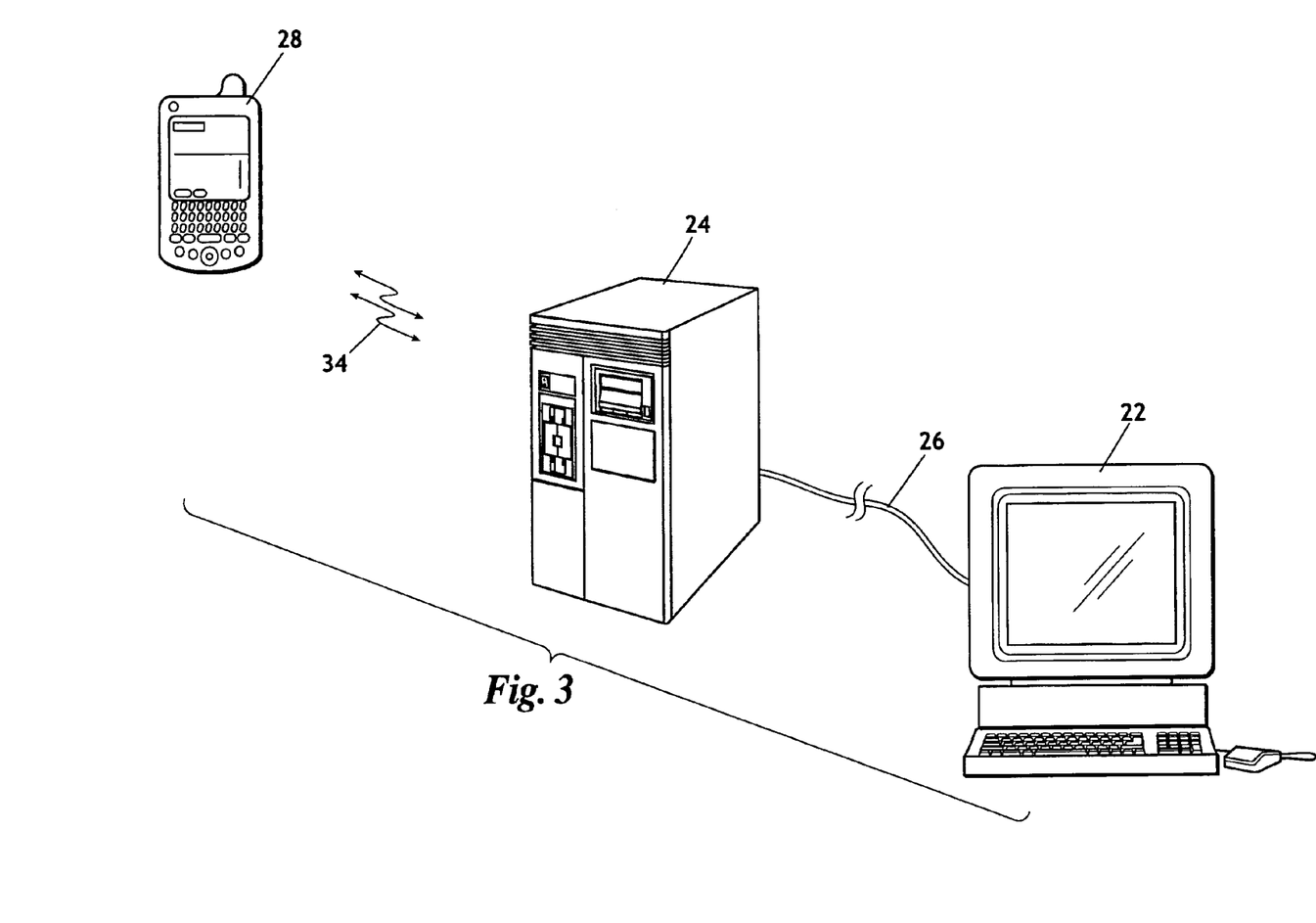
FIG. 3 provides a diagram of the inventive system as used for information collection and review.

Turning next to FIG. 3, in a preferred embodiment the user will initiate the execution of the questionnaire according to instructions previously provided to him or her. For example, the user might be instructed to initiate the questionnaire as soon as he or she pulls into the drive-in lane of a take-out eatery. This would be the case if the questionnaire were designed to collect information regarding service at that establishment. In such an event, the questionnaire might contain questions related to service time, cleanliness, friendliness of the employees, etc., all of which would potentially be of interest to the owner/client. The user will preferably respond to each question in turn, the questions being presented according to the logic defined by the client and built into the questionnaire. In some instances, the text of the question might instruct the user to perform acts and/or wait until a certain event happens before responding (e.g., "Pull up to the take-out window. How long was it before you received your order?") The user's responses to the items in the questionnaire are stored within the handheld 28 as they are collected. In some cases, the questionnaire logic might allow the user to skip questions and (optionally) return to them later. Additionally, the questionnaire designer might include a token that initiates a final review of the data collected from the user in this instance to make certain that all "required" questions, (which have preferably been so designated by marking them with the appropriate token) have been answered. Failure by the user to respond to a required question will result in the OIS prompting the user again for a response.

Several options are available for the transmission of responses from handheld 28 to server 24. First, regardless of the availability of connection 34, responses may be stored locally at handheld 28 until the form is fully completed and then sent as a batch to server 24. This transfer may optionally occur automatically, or upon direction of the user as specified by the client during the creation of the form. If the link is not available at the time of completion of the form, transmission will be automatically delayed until connection 34 is restored.

Alternatively, selected responses, or all responses, may be configured to transmit immediately upon entry, assuming of course that connection 34 is available. This option is particularly important where the user of handheld 28 has entered information which might be indicative of a problem with a process or indicate an emergency. Again, if connection 34 is unavailable, immediate transmissions will also be delayed until a connection is available.

As data from a handheld is received at server 24 it is processed, as necessary, and placed in a database where it can be accessed via the Internet 26. A client can then use a computer 22 with Internet access to review or use the data from virtually anywhere in the world.

Figure 4:
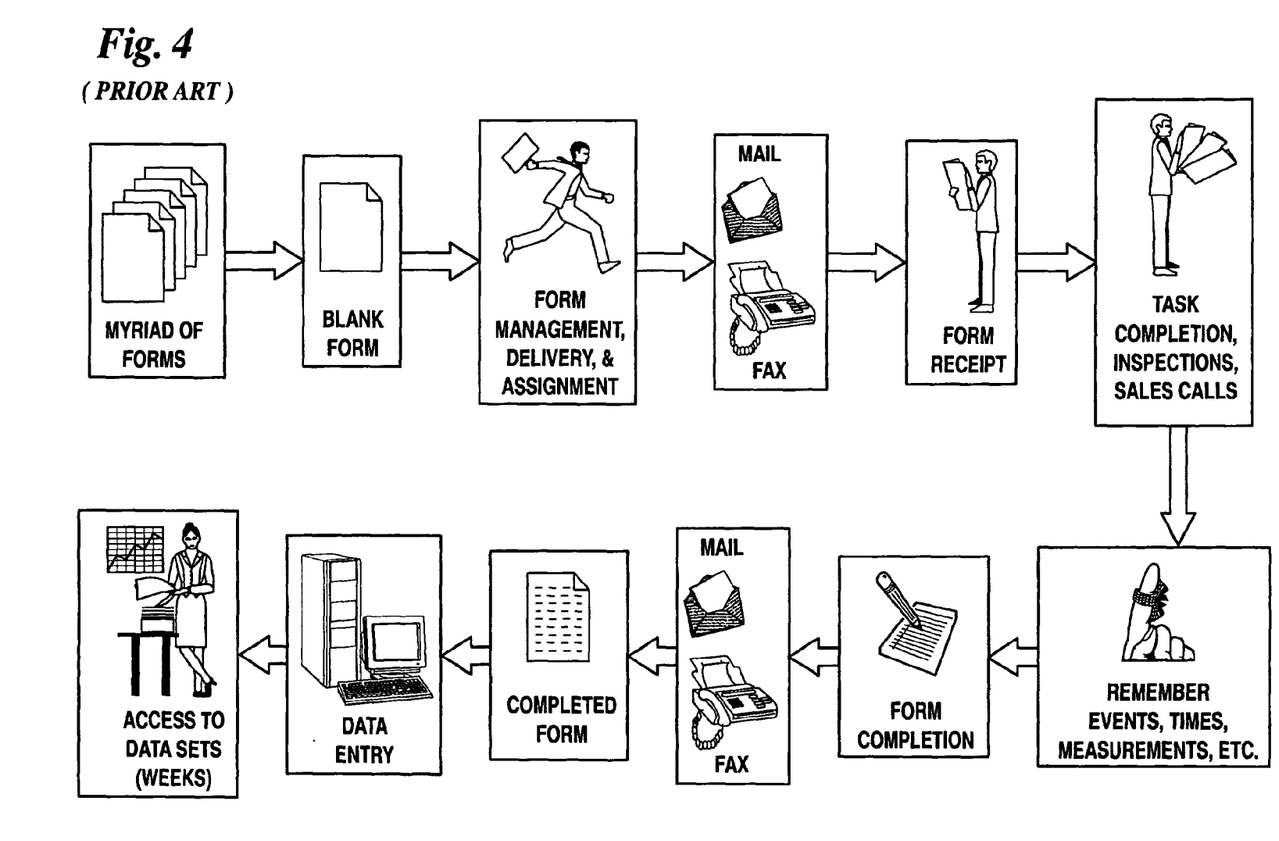
FIG. 4 depicts a sequence of tasks for collecting data through the use of prior art systems.

Turning next to FIG. 4, wherein a prior art system built around paper forms is shown, in the past, a paper form had to be created, printed, and delivered to a user of the form. Armed with the form, the user had to complete the assigned task and complete the form reflecting observations made during the task. If the user delayed in filling out the form, these observations were subject to the inaccuracies associated with human memory. A completed form was then typically delivered to yet another person for data entry before the information was finally available to others in the company. As will be appreciated by those familiar with such operations, whether a result of unreadable forms or a result of human error at data entry, this step is responsible for a significant level of errors.

Figure 5:
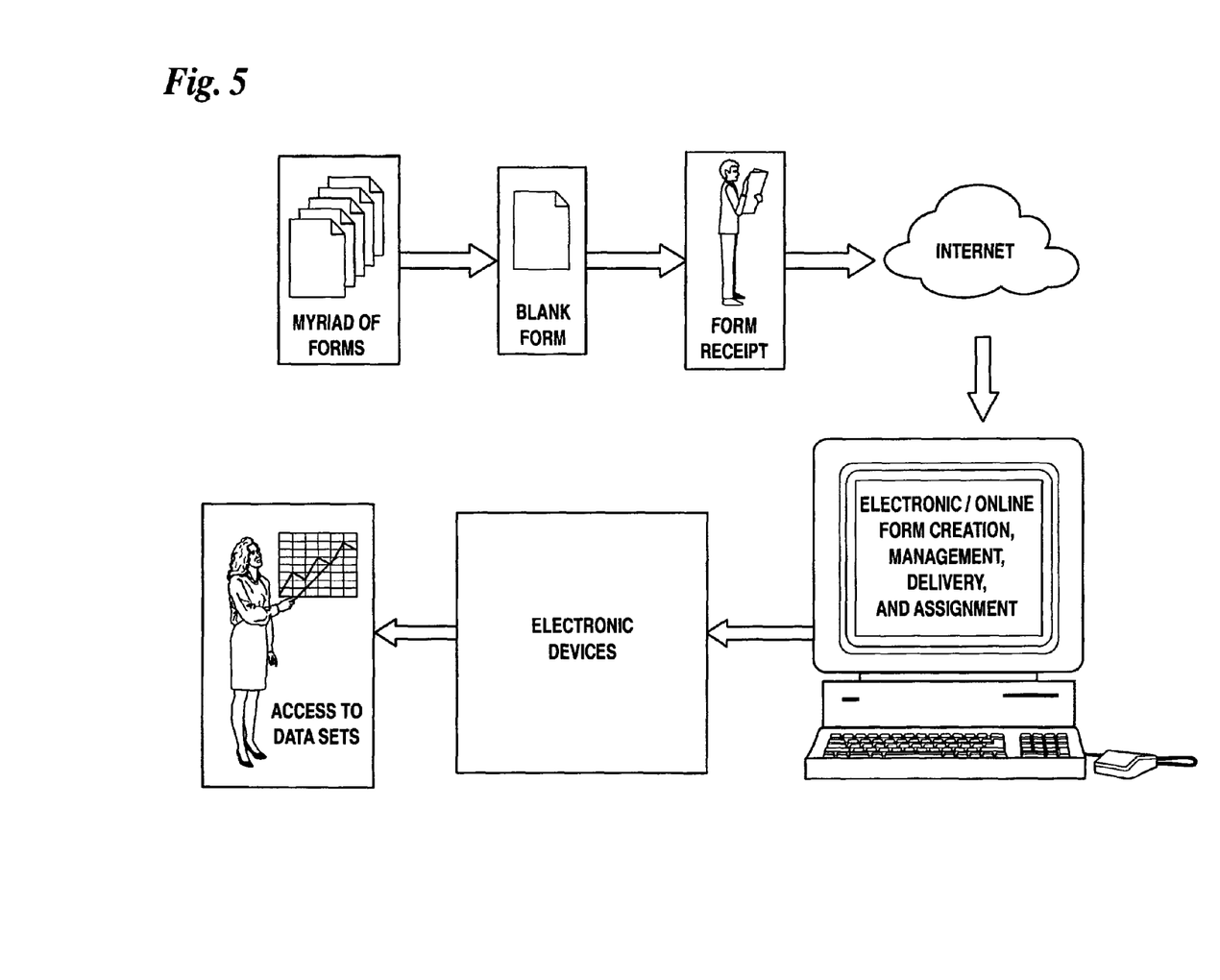
FIG. 5 depicts the tasks of FIG. 4 utilizing the inventive system.

Turning next to FIG. 5, in contrast to prior systems, with the present system, a form may be entered on-line, the form is automatically sent to the handheld computer of the user, usually within seconds, the user enters data directly at the location of the user's assigned task, eliminating memory errors, and made available to others in the organization in virtually a real time fashion. Thus, not only is the data almost instantly available, at least two sources of error, the memory of the user and data entry, have been eliminated.

An example of where the inventive system is particularly useful is in the area of mystery shoppers. Many restaurant chains and retail chain stores employ mystery shoppers to patronize one of the chain's establishments and report on the experience. In the area of fast food, a mystery shopper might, for example, use the drive through window to purchase a breakfast sandwich and a cup of coffee.

Prior to the trip to the restaurant, an employee of the client restaurant develops a questionnaire and enters it on the web site of the ASP that is providing the mystery shopper support service. In this case, the restaurant is interested in the waiting time of their patrons, the service provided to their patrons, and the quality of the food served. A questionnaire is designed to elicit such information from the shopper/user. The results of the mystery shopper's experience will be compared to quality standards established for the entire chain and used to rate the franchisee/owner of particular restaurants.

As the mystery shopper enters the parking lot, the shopper will be prompted to enter a store number or location. If the handheld computer is equipped with a GPS receiver, this information could be entered automatically. Of course the time and date from the computer's real time clock are preferably recorded in the form. As the shopper reaches the end of the drive through line, she starts a timer on the hand held computer, preferably by "tapping" on the face of the handheld in the appropriate region of the screen. When the speaker is reached, the first timer is stopped and a second timer is started.

If the shopper is asked to wait before ordering, a second timer is started and a third timer is started. Upon a request for her order, the mystery shopper stops the previous timers and yet a fourth timer is started. She orders her breakfast sandwich and coffee and pulls forward in line. While sitting in line, the handheld computer asks if the speaker could be clearly understood, if the menu was in good shape, and if the area around the menu appeared neat and clean.

Upon reaching the window, the shopper presses a button which stops the fourth timer and starts a fifth timer. As her money is taken, the fifth timer is stopped and yet a sixth timer is started. She pays with a twenty dollar bill and, upon receiving her change, notes the accuracy of her change, whether the person at the window is pleasant, stops the sixth timer and starts a seventh timer.

Upon receiving her food the seventh timer is stopped and she pulls into a parking place to sample the food and measure the temperature of the coffee with a temperature probe attached to her handheld computer. After entering her impression of the sandwich, the computer asks a few questions about the number of cars in the parking lot and the general appearance of the store.

As the shopper enters the last response, the CDPD modem attached to her handheld contacts the ASP and delivers the collected data which is forwarded to a database where it is accessible by the staff of the restaurant chain, only seconds after the shopper has taken her first bite of the sandwich.

Note that the user's interaction with the handheld in the previous example was all defined by logic that the client has incorporated into the questionnaire when it was designed. The text of the directions to the user (e.g., "Pull up to the drive-in window.") has been designed into the questionnaire. Additionally, preferably there will be tokens that represent "timers" which are designed to make it easy for the user to enter elapsed time information in response to a question (e.g., the user might be asked to tap the screen a first time to start the timer running and a second time to stop it, with the elapsed time being automatically calculated and stored as a response to a client question). Clearly, a goal of the instant system is to provide a client with the tools necessary to quickly and easily construct a complex questionnaire which presents the user with questions which are adaptively selected according to the wishes of the designer.

A second example of where the inventive system is particularly useful is the area of transfer by a medical service provider of a patient's medical information to an insurance company following treatment. In this example, data is exchanged between computers (handhelds, desktops, laptops, etc.) at different locations in a secure manner without providing an outside party access to the secure internal computer network of the medical service provider (MSP). The medical service provider is preferably a hospital, however, it is understood that this term could include clinics, minor emergency centers, physician's offices or any such provider of medical care/treatment.

Modern medical service providers are continually striving to develop methods of transferring medical records and data to insurance companies for rapid claims processing which requires the minimum of manual forms generation, handling, processing, and data entry. Moreover, pressure, both publicly and legislatively, is being applied to the healthcare industry as a whole to protect the privacy of this data including confidential patient information. As a result, transmission of medical information in secure, generally encrypted formats is required. However, such methods of data transfer require a high level of coordination between the medical service providers and the insurance companies, both of which are reluctant to allow the other, and especially third parties, access to their databases and network hardware necessary to achieve these levels of coordination.

The present system can be employed to manage the data flow in a manner that provides secure data transfer between parties without the necessity of either party allowing outside access to its respective data storage systems. In this embodiment, the medical service provider can use the system to design or update the medical forms as described above or contract with the ASP to develop and update such forms.

Figure 6:
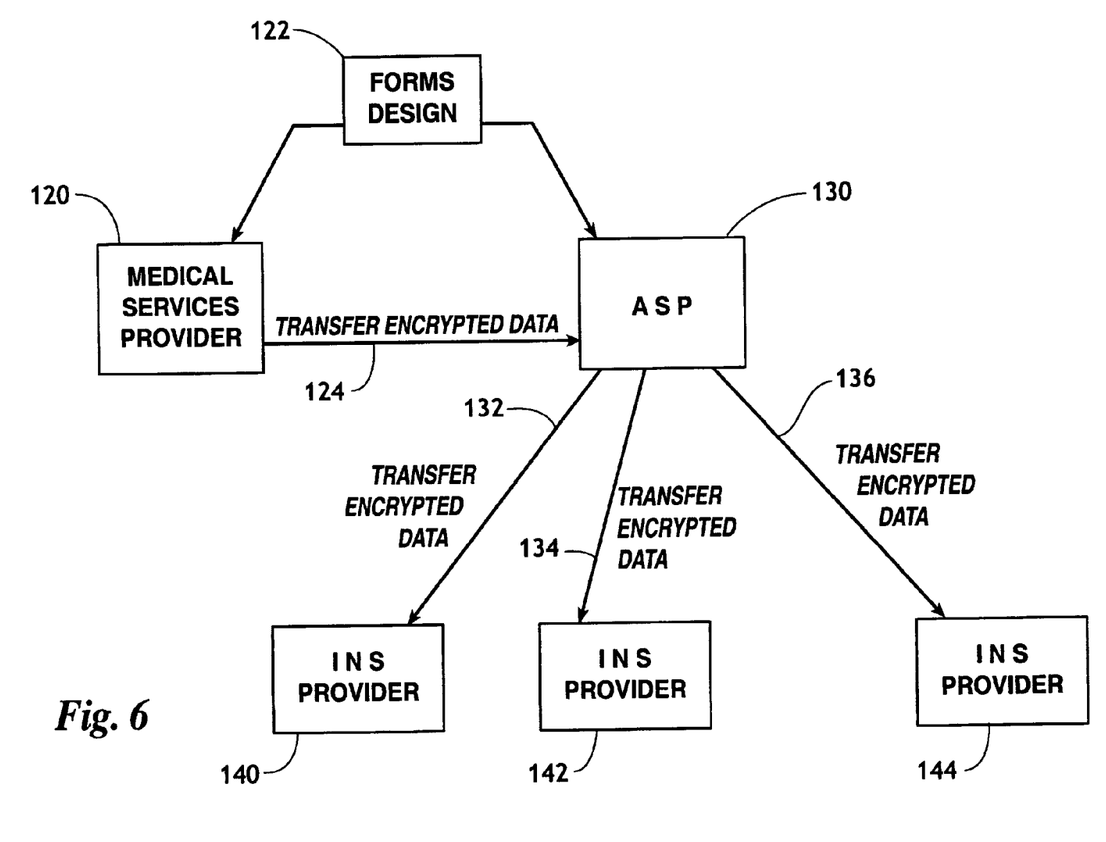
FIG. 6 is a work flow diagram of an embodiment utilizing the inventive system.

Referring to FIG. 6, a system diagram is shown depicting medical services provider 120 (MSP), ASP 130 and insurance companies 140, 142, and 144. As stated, the medical forms can be designed and/or updated seamlessly by the MSP or ASP as shown in 122. The computers of MSP would be equipped with the inventive OIS thereon to allow forms design, branching logic, and cryptic data transfer at 122. Once the medical form is designed, medical information can be entered onto the form(s) in the system following treatment by the MSP. Once entered, the data is converted to tokenized form by the OIS for encrypted transfer to the ASP 130 according to step 124. In this way, a patient's medical data is continuously, seamlessly and securely transferred between MSP 120 and ASP 130.

Once the ASP 130 receives the tokenized data from MSP 120 pursuant to transfer 124, the data is stored in a standard database or a database customized for each insurance company within ASP 130. In a preferred arrangement, the ASP will then alert one or more of the relevant insurance providers 140, 142, and/or 144 that data is present and available for immediate retrieval from the database of ASP 130. In the alternative, the system could be embodied such that insurance providers 140, 142, and 144 would periodically query ASP 130 on a set time interval regarding the presence of information.

At the time insurance providers 140, 142, and/or 144 are aware that data is present and available from ASP 130, the insurance provider can access the ASP via a global computer network such as the Internet for retrieval of such information. Typically, access to information maintained by ASP 130 is restricted by password or other similar security measures. Insurance provider 140, 142, and/or 144 can then download data from ASP 130 which is either encrypted in a standard format or in a format which is customized for the insurance provider (and may also be encrypted). The download step is depicted by arrows 132, 134, and 136, respectively.

In this embodiment, the customer of ASP 130, typically MSP 120, would be billed for the transaction or by the volume of data transmitted.

Accordingly, a secure method of transfer of medical information between MSP 130 and insurance providers 140, 142, and/or 144 is defined using the method and apparatus of the present invention.

By way of example and not limitations, various preferred embodiments of the instant invention will include a number of desirable features or traits such as: 128-bit CerticomT end-to-end wireless security; ability of the administrator to clean erroneous data; all data and administrative transactions on one or more secure servers; form question responses are time stamped; centralized online repository of all form responses; the complete form is available for review or update on the Web; context-sensitive help; from the customer's perspective, the system is scalable and flexible; users, questionnaires, and responses manageable as groups; data exportation to CSV, XLS, XML, as well as any other format or external application; ability to define multiple form administrators; forms deployable wirelessly over the Internet; error checking for dropped connection in a loosely networked environment; a provider of the service can offer secondary services such as form design consulting services; partially completed forms can be saved and restarted; OIS allows data to be gathered in virtually any form factor, i.e. web, handheld, phone, laptop, and the like; the client can inspect individual responses from a form; multiple forms can be made available on same device; online data report generation and publishing from gathered responses; optional authentication of users; responses can be subjected to bounding and validation logic; real-time accessibility to form responses from an Internet connected desktop; responses retrievable or accessible anywhere in the world via a provider's web site; robust question branching logic; unlimited administrative control of the user, e.g. a user can be prevented from completing a form more than once; administrative hierarchy allowing some administrators to view other administrators' data, if allowed; web based service eliminates the need for client installation; archival of old forms and responses; user interfaces brandable with corporate identity; ability to clone, or modify, existing forms into a new form; ability to create summary reports with informative charts; customizable reports can be designed to meet clients' specific needs; definable start and stop dates for forms allow control of a time frame over which data can be gathered; ability to include pictures in questions; responses from various forms can be merged into a common report; phone call completion of forms; administrators can be provided with predefined question and form libraries; responses can be reviewed prior to submitting; print form responses from the remote computer; administrative control of questionnaire aesthetics; software developers kit can be provided by the service provider; language controls available during question development, i.e. spell check, thesaurus, translation of multi-language forms, extended character sets, etc.; various events can be triggered from within a form; and reports can be viewed on the remote computer.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A method for managing data including the steps of:
   (a) creating a questionnaire comprising a series of questions customized for a location;
   (b) said questionnaire including at least one question requesting GPS coordinates;
   (c) tokenizing said questionnaire, thereby producing a plurality of device indifferent tokens representing said questionnaire;
   (d) transmitting said plurality of tokens to a remote computing device;
   (e) when said remote computing device is at said location, executing at least a portion of said plurality of tokens representing said questionnaire at within said remote computing device to collect a response from a user;
   (f) automatically entering the GPS coordinates into said questionnaire;
   (g) transmitting at least a portion of said response from the user to a server in real time via a network; and
   (h) storing said response at said server.

2. The method for managing data of claim 1 further comprising the step of:
   (i) translating said response to a format recognizable by a particular computer program; and
   (j) accessing the translated response from a computer executing said particular computer program.

3. The method for managing data of claim 1 wherein step (a) includes the substeps of:
   (a) creating a questionnaire by:
      (i) entering a series of questions into a questionnaire design computer program;
      (ii) identifying within said questionnaire design computer program the type of response allowed for each question of said series of questions; and
      (iii) identifying within said questionnaire design computer program a branching path in said questionnaire for each possible response to each question of said series of questions.

4. The method for managing data of claim 1 wherein step (b) includes the substeps of:
   (b) tokenizing said questionnaire thereby producing a plurality of tokens representing said questionnaire by:
      (i) assigning at least one token to each question of said series of questions;
      (ii) assigning at least one token to each response called for in said series of questions to identify the type of response required; and
      (iii) assigning at least one token to each branch in said questionnaire to identify the required program control associated with said branch.

5. The method of data management of claim 1 wherein the transmission of said tokens in step d) occurs via the network of step g).

6. A method for modifying a questionnaire used in data management according to the method of claim 1 including the steps of:
   making at least one incremental change to a portion of the questionnaire;
   tokenizing said at least one incremental change to said questionnaire to obtain change tokens;
   transmitting at least a portion of said change tokens to said remote computing device in real time, said transmitted change tokens comprising less than the entire tokenized questionnaire;
   (d) incorporating said transmitted change tokens into said questionnaire at said remote computing device.

7. A method for collecting survey data from a user and making responses available via the Internet, comprising:
   (a) designing a questionnaire including at least one question said questionnaire customized for a particular location having branching logic on a first computer platform wherein at least one of said at least one questions requests location identifying information;
   (b) automatically transferring said designed questionnaire to at least one loosely networked computer having a GPS integral thereto;
   (c) when said loosely networked computer is at said particular location, executing said transferred questionnaire on said loosely networked computer, thereby collecting responses from the user;
   (d) while said transferred questionnaire is executing, using said GPS to automatically provide said location identifying information as a response to said executing questionnaire;
   (e) automatically transferring via the loose network any responses so collected in real time to a central computer; and,
   (f) making available via the Internet any responses transferred to said central computer in step (e).

8. The method for collecting survey data according to claim 7 further comprising:
(f) assessing a charge for each transferred response received by said central computer.

9. A method for managing data comprising the steps of:
(a) establishing communications between a handheld computing device and an originating computer wherein said handheld computing device has a GPS integral thereto;
(b) using said GPS to automatically obtain location identifying information for said handheld computing device;
(c) transmitting said location identifying information from said handheld computing device to said originating computer;
(d) receiving within said handheld computing device a transmission of a tokenized questionnaire customized for a particular location from said originating computer, said tokenized questionnaire comprising a plurality of device indifferent tokens;
(e) ending said communications between said handheld computing device and said originating computer;
(f) after said communications has been ended, when said handheld computing device at said particular location:
 (f1) executing at least a portion of said plurality of tokens comprising said questionnaire on said handheld computing device to collect at least one response from a user, and,
 (f2) storing within said computing device said at least one response from the user;
(g) establishing communications between said handheld computing device and a recipient computer; and,
(h) transmitting a value representative of each of said at least one response stored within said handheld computing device to said recipient computer.

10. The method for managing data according to claim 9, wherein step (d) comprises the steps of:
(d1) creating a questionnaire,
(d2) tokenizing said questionnaire, thereby producing a plurality of device independent tokens representing said questionnaire,
(d3) storing said plurality of tokens on a computer readable medium accessible by said originating computer,
(d4) accessing said stored plurality of tokens from said originating computer,
(d5) transmitting said stored plurality of tokens from said originating computer to said handheld computing device, and,
(d6) receiving within said handheld computing device said transmission of said tokenized questionnaire from said originating computer.

11. The method for managing data according to claim 9, wherein said originating computer and said recipient computer are a same computer.

12. The method for managing data according to claim 9, wherein said step (f1) comprises the steps of:
(i) requiring a user to authenticate with said handheld computing device,
(ii) only if the user is able to authenticate with said handheld computing device, executing at least a portion of said plurality of tokens comprising said questionnaire on said handheld computing device to collect at least one response from a user, and,
(iii) if the user is unable to authenticate with said handheld computing device, taking no further action.

13. The method for managing data according to claim 9, wherein said questionnaire comprises at least one question that requests location identifying information and at least one other Question.

14. The method for managing data according to claim 13, wherein at least one of said at least one other question is selected from a group consisting of a food quality question, a service quality question, a waiting time question, a store number question, a location question, a time question, a date question, a temperature question, and a time of day question.

15. The method for managing data according to claim 9, wherein step (a) comprises the step of establishing communications via a global computer network between said handheld computing device and said originating computer.

16. A method for manacling data comprising the steps of:
(a) establishing communications between a handheld computing device and an originating computer, said handheld device having at least a capability to determine a current location thereof;
(b) receiving within said handheld computing device a transmission of a tokenized questionnaire including at least one question requesting GPS coordinates, said tokenized questionnaire comprising a plurality of device independent tokens;
(c) ending said communications between said handheld computing device and said originating computer;
(d) after said communications has been terminated, when said handheld computing device is at said particular location
 (d1) executing at least a portion of said plurality of tokens comprising said questionnaire on said handheld computing device to collect at least said current location of said handheld computing device; and;
 (d2) storing within said handheld computing device said current location;
 (d3) automatically entering the GPS coordinates into said questionnaire;
(e) establishing communications between said handheld computing device and a recipient computer; and,
(f) transmitting at least one value representative of said stored current location to said recipient computer.

17. The method for managing data according to claim 16 wherein said current location of said handheld computing device is determined using GPS.

18. The method for managing data according to claim 16, wherein said originating computer and said recipient computer are a same computer.

19. A method for managing data comprising the steps of:
(a) establishing communications between a handheld computing device and an originating computer wherein said handheld computing device has a GPS integral thereto;
(b) receiving within said handheld computing device a transmission of a tokenized questionnaire from said originating computer, said tokenized questionnaire including at least one question requesting location identifying information, said tokenized questionnaire comprising a plurality of device independent tokens;
(c) ending said communications between said handheld computing device and said originating computer;
(d) after said communications has been ended,
 (d1) executing at least a portion of said plurality of tokens comprising said questionnaire on said handheld computing device to collect at least one response from a first user, and,
 (d2) storing within said computing device said at least one response from the first user;

(d3) using said GPS to automatically obtain said location identifying information in response to said at least one question that requests location identifying information;

(e) establishing communications between said handheld computing device and a recipient computer;

(f) transmitting a value representative of each of said at least one response stored within said handheld computing device to said recipient computer; and, (g) after receipt of said transmission of step (f), transmitting a notice of said received value representative of each of said at least one response to a second user.

20. The method for managing data according to claim 19, wherein the first user and the second user are a same user.

21. A method for managing data comprising the steps of:

(a) within a central computer, accessing at least one user data item stored in a recipient computer, wherein said at least one data item is obtained via the steps of:

(1) establishing communications between a handheld computing device and an originating computer wherein said handheld computing device has a GPS integral thereto;

(2) receiving within said handheld computing device a transmission of a tokenized questionnaire, including at least one question requesting GPS coordinates and at least one additional question, said tokenized questionnaire comprising a plurality of device independent tokens;

(3) ending said communications between said handheld computing device and said originating computer;

(4) after said communications has been ended, (i) executing at least a portion of said plurality of tokens comprising said questionnaire on said handheld computing device, (ii) automatically entering the GPS coordinates into said questionnaire:

(iii) presenting said at least one additional question to a user;

(iv) receiving at least one response from the user to each of said presented at least one additional question, (v) storing at least one value representative of said GPS coordinates and said at least one response within said handheld computing device;

(5) establishing a communications link between said handheld computing device and a recipient computer;

(6) transmitting said stored at least one value representative of said GPS coordinates and said at least one response stored within said handheld computing device to said recipient computer; and, (7) storing within said recipient computer any of said transmitted GPS coordinates and said at least one value representative of said at least one response, thereby creating said at least one user data item stored in said recipient computer; and, (b) forming a visually perceptible report from any of said at least one stored user data item.

22. The method according to claim 21, wherein said central computer and said recipient computer are a same computer.

* * * * *

(12) INTER PARTES REVIEW CERTIFICATE (2934th)
United States Patent (10) Number: US 9,454,748 K1
Payne (45) Certificate Issued: Dec. 19, 2022

(54) SYSTEM AND METHOD FOR DATA MANAGEMENT

(75) Inventor: J. David Payne

(73) Assignee: FALL LINE PATENTS, LLC

Trial Number:

IPR2019-00610 filed Jan. 22, 2019

Inter Partes Review Certificate for:

Patent No.: 9,454,748
Issued: Sep. 27, 2016
Appl. No.: 12/910,706
Filed: Oct. 22, 2010

The results of IPR2019-00610 are reflected in this inter partes review certificate under 35 U.S.C. 318(b).

INTER PARTES REVIEW CERTIFICATE
U.S. Patent 9,454,748 K1
Trial No. IPR2019-00610
Certificate Issued Dec. 19, 2022

AS A RESULT OF THE INTER PARTES REVIEW PROCEEDING, IT HAS BEEN DETERMINED THAT:

Claim 7 is found patentable.

Claims 1, 2, 5 and 19-22 are cancelled.

\* \* \* \* \*